United States Patent [19]

Temple

[11] Patent Number: 4,632,539

[45] Date of Patent: Dec. 30, 1986

[54] AIR-COOLED APPARATUS

[75] Inventor: Stephen Temple, Cambridge, Great Britain

[73] Assignee: Xerox Corporation, Stamford, Conn.

[21] Appl. No.: 749,698

[22] Filed: Jun. 28, 1985

[30] Foreign Application Priority Data

Jul. 2, 1984 [GB] United Kingdom ................. 8416788

[51] Int. Cl.⁴ ............................................. G03B 27/52
[52] U.S. Cl. ..................................................... 355/30
[58] Field of Search .......................................... 355/30

[56] References Cited

U.S. PATENT DOCUMENTS

| 3,330,180 | 7/1967 | Ferguson et al. | 355/30 |
| 3,598,486 | 8/1971 | Kushima | 355/30 |
| 3,936,672 | 2/1976 | Tanaka | 355/1 |
| 4,411,516 | 10/1983 | Adachi et al. | 355/30 |
| 4,530,589 | 7/1985 | Adams | 355/30 |

FOREIGN PATENT DOCUMENTS

| 52-65446 | 5/1977 | Japan | 355/30 |
| 54-1623 | 8/1979 | Japan | 355/30 |
| 212425 | 12/1982 | Japan | 355/30 |
| 58-78179 | 5/1983 | Japan | 355/30 |

Primary Examiner—Monroe H. Hayes

[57] ABSTRACT

This invention relates to apparatus for cooling a mercury vapor lamp, or other longitudinally-extending body, by causing a flow of cooling air to pass along a conduit extending along the length of the lamp. The source of the coolant is a blower directing air along the interior of an open-sided housing extending in parallel with the direction of movement of the lamp. A scoop at one end of the conduit projects into the interior of the housing so as to direct the flow of cooling air passing along the housing into the interior of the conduit at all relative positions of the lamp and housing. In one preferred form of the invention the housing functions as one of the guide rails on which the lamp is mounted for reciprocal movement.

2 Claims, 1 Drawing Figure

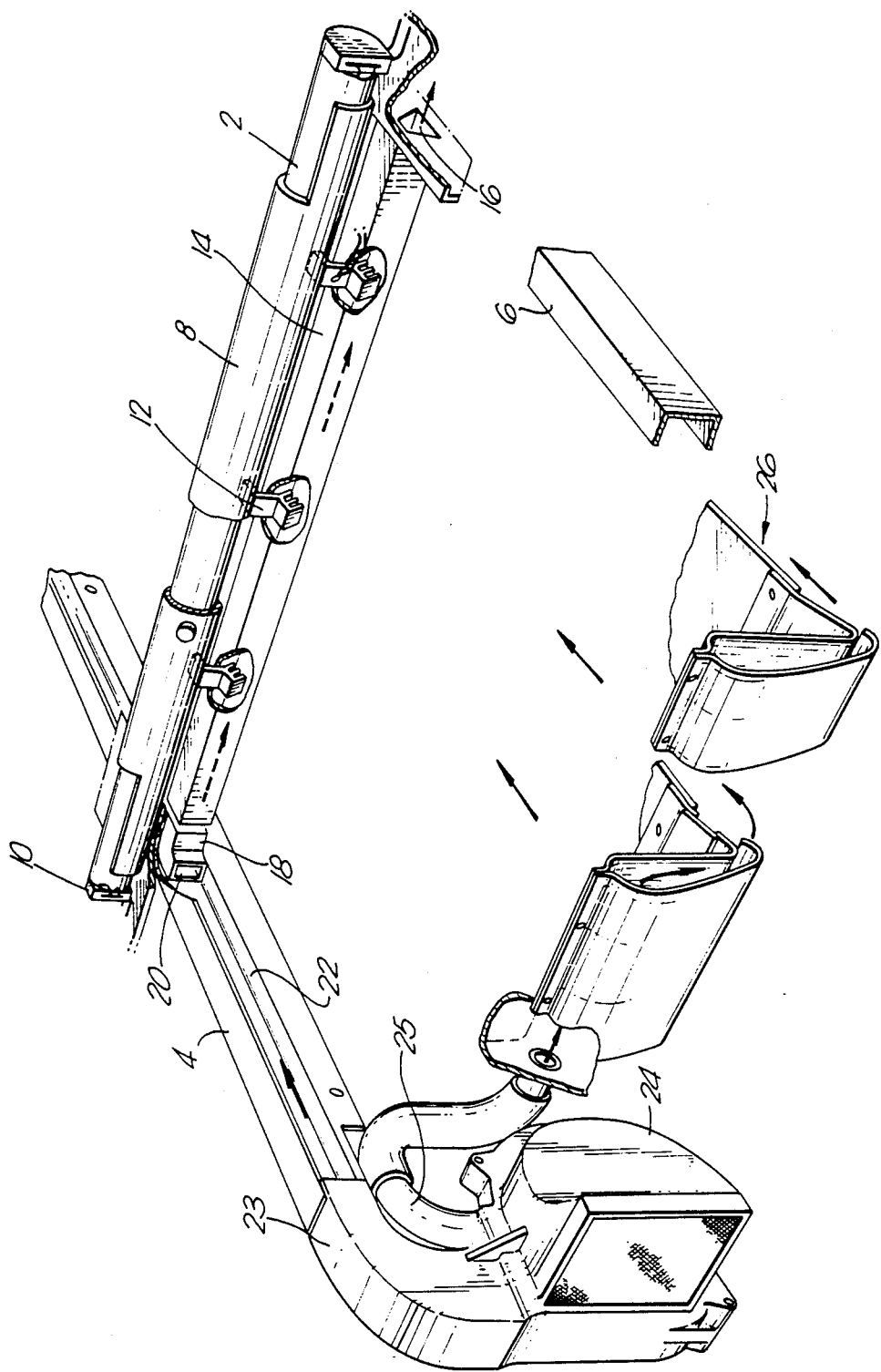

AIR-COOLED APPARATUS

This invention relates to air-cooled apparatus, particularly of the type in which a longitudinal heat-emitting body is translated or reciprocated along a fixed path transverse to the axis of the body.

One such heat-emitting body for which the present invention is particularly suitable is the low-pressure, mercury vapour, fluorescent discharge lamp as used in some xerographic copiers. Such a lamp for its operation requires to have its body heated to a temperature at which the mercury in the lamp is partially vaporised to facilitate the light-emitting electrical discharge. To facilitate its operation, the lamp body needs to have one or more 'cold spots', in order to induce condensation of the mercury vapour at selected locations. Such cold spots are usually brought about by positioning at least one heat exchanger in thermal contact with the lamp body, the heat exchanger being cooled by a force draught. Such a draught could be produced by a dedicated blower movable with the lamp, but this would increase the inertia and bulk of the movable components, and is thus an imperfect solution to the cooling problem.

The present invention aims at enabling the heat source to be supplied with a coolant air supply, provided by a stationary blower, both while moving and stationary anywhere over its range of movement.

Accordingly the present invention provides apparatus for cooling a longitudinally-extending heated body, adapted to be translated in a transverse direction, including a conduit extending in parallel with the body and containing, or consisting of, the body to be cooled; at least one stationary housing extending in parallel with the direction of movement of the body and having in it a longitudinal opening; a blower coupled to one end of the housing for blowing a stream of coolant air down its length, and a scoop extending through the opening and in communication with one end of the conduit, whereby a significant proportion of the air stream along the housing is diverted so as to flow along the conduit to remove heat therefrom, irrespective of the position or movement of the conduit and scoop along the length of the housing.

The present invention will now be described by way of example with reference to the accompanying drawing, which is a perspective diagrammatic view of one form of the present invention as applied to a xerographic copier.

The copier includes a low-pressure, mercury vapour, fluorescent discharge lamp 2 able to be reciprocated (by means not shown) along the length of a pair of guide rails 4 and 6 extending in parallel with each other and perpendicularly to the axis of the lamp 2.

Closely embracing the external surface of the lamp body is an electrically-energised heater jacket 8 positioned so as not to block the path of light between the lamp 2 and an associated platen (not shown) on which is mounted a document to be copied. The lamp 2 extends across the guide rails 4 and 6 and is supported by them for reciprocal movement over the area between them under the influence of an intermittently-operated drive motor (not shown). The electrical connections to the end terminals 10 on the lamp 2 are such as to permit the lamp to be energised throughout its whole range of movement, so that it remains energised as it traverses below the platen in at least one direction, in order to throw light on the document supported by the platen so that light reflected from the document selectively discharges the associated photoreceptor (not shown) so that the pattern of electrical charge on the photoreceptor duplicates the pattern of data-bearing indicia on the document. All this is well known to those acquainted with xerography.

For effective operation of the lamp 2, it is desirable or necessary to have cold spots provided at at least one location of the lamp envelope, in order to encourage the condensation of mercury vapour at that point, in order to provide a supply of free liquid mercury to facilitate the gaseous discharge process taking place in the lamp. As shown in the drawing, three cold spots are provided, each being brought about by contacting the surface of the lamp 2 with one limb of a metal heat exchanger 12. The limb is in good thermal contact (by virtue of its integral construction) with three fins designed to present a large surface area to a flow of cooling air, so as to enhance the loss of heat from the lamp body to the air. This loss is encouraged by arranging for each heat exchanger 12 to project into the interior of a conduit 14 of rectangular cross-section which is secured to the lamp assembly so as to extend between the guide rails 4 and 6.

At the right-hand end of conduit 14 as viewed, the stream of cooling air is exhausted into the interior of the copier through an outlet 16. At its other end the conduit is provided with a scoop 18 presenting a rectangular inlet 20 at right-angles to the axis of the lamp and covering a significant part of the cross-sectional area of the interior of guide rail 4. As can be seen from the drawing, guide rail 4 is of substantially rectangular cross-section, with one wall missing in order to leave a longitudinally-extending opening 22 through which the scoop 18 projects into the interior of the guide rail.

At one end, this interior space of guide rail 4 is connected to one outlet 23 of a blower 24. The blower has at least one other outlet 25 which passes a flow of cooling air to an optics casting shown generally at 26 but which will not be described herein in greater detail.

It has been found, rather surprisingly, that the air directed into the interior of the open-sided guide rail 4 tends to flow along that interior and does not pass out of it, at least to any significant extent, into the interior of the copier. This entrainment of the air flow is such that even at the position of the lamp most remote from the blower a sufficient quantity of the air flowing along the guide rail enters the scoop and passes along conduit 14 to effect the desired cooling of the heat exchangers 12. It will be appreciated that as the lamp moves towards the blower, the increased relative speed of the lamp and blower causes a greater quantity of air to flow along the conduit, so as to increase the cooling effect, but the resultant transient increase of cooling has a negligible effect on the light output of the lamp, because of the time delays inherent in the length of the various heat flow paths.

From the above, it will be clear that the heater 8 loses heat to the lamp body 2, which in term loses heat to the heat exchangers.

One of the heat exchangers is provided with a thermistor (not shown) for monitoring the temperature of the space below the platen. The thermistor is in the energisation circuit to blower 24, so that the blower is switched on whenever the cavity temperature exceeds 40° C. It is also responsive to the temperature of the heat exchanger itself, so that the blower is also switched on when the temperature of the heat exchanger approaches too closely the temperature of the lamp. When the temperature of the heat exchanger is below 30° C., and the copier is in its 'copy' mode, the blower will remain or become switched off.

Another of the heat exchangers has a thermostat mounted on it by means of a block of material of poor thermal conductivity, so as to introduce a thermal delay in the path between the heater 8 and the thermostat. The thermostat also has its own heat exchanger extending into the interior of conduit 14, so as to render the thermostat sensitive to the ambient temperature. This arrangement of mounting and operating the thermostat will not be described herein in any further detail.

Accordingly, it will be seen that the present invention provides a cheap and efficient means for cooling heat exchangers associated with a mercury vapour lamp, so as to encourage the formation and maintenance of cold spots.

I claim:

1. An improved apparatus for scan/illuminating a document lying in an object plane comprising:

an illumination lamp assembly including an elongated illumination lamp, an air passage conduit adjacent to, and extending the length of the lamp, and at least one heat exchanger having one end in thermal contact with the lamp and the other end extending into said conduit, said lamp assembly adapted to move along at least one guide means located in a plane beneath and parallel to said object plane, said guide means having a longitudinally extending recess formed along at least a part of its length, a scoop member connected to one end of said lamp assembly and adapted to move therewith, said scoop member being in thermal communication with said guide means recess and with the interior of the conduit, and means for introducing cool air into said guide means recess at a point remote from said lamp assembly, whereby said cool air travels along said recess and is directed by said scoop member into said conduit thereby serving to cool said heat exchanger member.

2. The apparatus of claim 1 wherein said end of said heat exchanger extending into said conduit comprises a plurality of fins presenting a large surface area to the coolant air stream.

* * * * *